United States Patent [19]
Suzuki et al.

[11] 3,880,738
[45] Apr. 29, 1975

[54] PROCESS FOR PRODUCING HIGH-MOLECULAR NUCLEIC ACIDS BY FERMENTATION

[75] Inventors: Takeo Suzuki; Fusao Tomita; Seiga Ito, all of Machida, Japan

[73] Assignee: Kyowa Hakko Kogyo Kabushiki Kaisha, Tokyo-to, Japan

[22] Filed: June 4, 1973

[21] Appl. No.: 367,036

Related U.S. Application Data

[63] Continuation of Ser. No. 80,239, Oct. 12, 1970, abandoned.

[52] U.S. Cl. ............... 195/28 N; 260/211.5 R
[51] Int. Cl. ............................................. C12d 13/06
[58] Field of Search ................... 195/28 N, 28 R

[56] References Cited
UNITED STATES PATENTS 3,634,194   1/1972   Frankenfeld ............... 195/28 N
3,637,461   1/1972   Tanaka et al. ............... 195/28 R

*Primary Examiner*—Alvin E. Tanenholtz
*Attorney, Agent, or Firm*—Wolder & Gross

[57] ABSTRACT

The present invention relates to a process for producing deoxyribonucleic acids and/or ribonucleic acids (hereinafter designated as high-molecular nucleic acids), which is characterized by culturing aerobically a microorganism capable of producing deoxyribonucleic acid and/or ribonucleic acid in a culture medium containing hydrocarbon or carbohydrate as main carbon source, accumulating a substantial amount of deoxyribonucleic acid and/or ribonucleic acid and recovering the accumulated deoxyribonucleic acid and/or ribonucleic acid from the fermentation liquor.

9 Claims, No Drawings

PROCESS FOR PRODUCING HIGH-MOLECULAR NUCLEIC ACIDS BY FERMENTATION

This is a continuation of application Ser. No. 80,239 filed Oct. 12, 1970, now abandoned.

As a result of extensive studies, an improved process for producing high-molecular nucleic acids has been found which is applicable to the commercial production of high-molecular weight nucleic acids by the use of inexpensive hydrocarbons or carbohydrates as in raw material.

High-molecular weight nucleic acids have heretofore been obtained by extraction from microorganism cells as well as from higher animals or higher plants, which have been destroyed in various manner. However, the extraction and recovery procedures of these methods are more or less hazardous owing to the considerable loss of nucleic acids as well as of the presence of the residues of the destroyed cells. In contrast, according to the process of the present invention, it is not necessary to destroy cells. Furthermore, undesired high-molecular weight compounds other than the high-molecular weight nucleic acids can easily be removed.

The present invention can advantageously be applied to commercial preparation of high-molecular weight nucleic acids. The supernatant obtained by removing microbial cells from the fermentation liquor can be treated by a conventional process (such as illustrated in Example 1) to recover high-molecular weight nucleic acids in simple manner and inexpensively.

It has previously been reported to extract and recover high-molecular weight nucleic acids from cells of microorganisms as well as of animals or plants. However, processes for culturing and accumulating high-molecular weight nucleic acids directly in a culture medium has never been reported in prior art publication, and represents a new teaching according to the present invention.

According to the present invention, it is possible to produce high-molecular nucleic weight acids by fermentation, which is hereafter termed as high-molecular weight nucleic acids fermentation, and which can advantageously be applied to commercial preparation of high-molecular weight nucleic acids, because almost all of the thus produced high-molecular nucleic acids are dissolved in aqueous solution.

All of the strains referred to in the present specification by ATTC number are freely available to the public, and are on deposit at the American Type Culture Collection.

Microorganism which may preferably be used for the purpose of the present invention includes, for example, the following:

| | |
|---|---|
| Arthrobacter paraffineus | ATCC 15590 |
| Arthrobacter simplex | ATCC 15799 |
| Brevibacterium ketoglutamicum | ATCC 15587 |
| Micrococcus ureae | ATCC 21288 |
| Arthrobacter hydrocarboglutamicus | ATCC 15583 |
| Corynebacterium hydrocarboclastus | ATCC 15592 |
| Pseudomonas fluorescens | ATCC 948 |
| Pseudomonas aeruginosa | ATCC 15246 |
| Asperillus oryzae | ATCC 7252 |
| Candida lipolitica | ATCC 8861 |

As apparent from the above, various microorganisms of the present invention can be used regardless to the genus and family in taxonomy. The group consisting of Arthrobacter, Brevibacterium, Micrococcus, Corynebacterium, Pseudomonas, Asperillus and Candida is however preferred.

Better results can be obtained by the use of n-paraffin and various hydrocarbon fractions containing n-paraffin as a carbon source. Preferably such n-paraffins contain $C_{10}$ to $C_{22}$ especially $C_{12}$ to $C_{18}$ carbon atoms. It is possible, however, to use various other carbon sources such as any kind of assimilable hydrocarbons and carbohydrate, e.g., glucose, sorbitol, etc., organic acids or alcohols, preferably $C_2$ to $C_{20}$ acids or alcohols, etc., which are assimilable to the microorganism.

As the nitrogen source both inorganic and organic nitrogen sources can be used.

In carrying out the fermentation of the present invention, a medium containing hydrocarbon or carbohydrate as main carbon source along with the aforementioned nitrogen source is employed. Inorganic salts and required growth-promoting substances are added to the medium. The culture the medium, and the medium cultured under aerobic conditions, generally at 20° C to 60°C and preferably at a temperature of from 30°C to 42°C. During the cultivation urea solution, ammonia water, ammonia or ammonium carbonate solution is added to give an adjusted pH of from 4 to 10, preferable 6 to 9.

The fermentation is generally completed in about 7 days, but it is preferred to continue the fermentation until the determination of nucleic acids indicates a maximum.

The following non-limitative examples illustrate the invention.

EXAMPLE 1

*Arthrobacter simplex* (ATCC 15799) was cultured in a medium containing meat extract (1.0%), pepton (1.0%), NaCl (0.5%) and glucose (2%) and having an adjusted pH of 7.2 (before sterilization). Culturing took place for 24 hours with shaking to obtain a seed culture. The seed culture was then used to inoculate a medium (3.0 1) containing meat extract (1.0%), peptone (1.0%), NaCl (0.5%) and glucose (10%) and having an adjusted pH of 7.2 (before sterilization). A 5 liter jar fermenter and a volume ratio of 10% was employed. The cultivation was carried out at 30°C or 30 hours with agitation (400 r.p.m.) and aeration (1 l/min. The medium was adjusted to a pH 6.5 – 7.5 with ammonia water. When the cultivation was completed, the glucose was almost consumed.

To 1 liter of the fermented liquor obtained by removing microbial cells from the fermentation broths was added about 500 ml of phenol which had been saturated by a solution containing NaCl (0.15 mol) and sodium citrate (0.01 mol). The treated liquor was subjected to shaking and centrifuged. After this, the resultant upper layer was collected.

Repeating the procedure twice, the upper layers were combined to obtain an aqueous solution, to which an equivalent of 95% ethanol (or methanol) was added. The resultant fibrous precipitates were recovered to give crude deoxyribonucleic acids. The crude deoxyribonucleic acid was purified by subjecting it twice to the ribonuclease treatment and a similar phenol treatment to give 0.7 g of purified deoxyribonucleic acid. It was found that the molecular weight of this preparate was more than $5 \times 10^5$ when determined by means of the gradient sucrose density centrifugation method using deoxyribonucleic acid of phage λ as standard [Modified Method of J. Marmur: J. mol. Biol. 3, 208 (1961)].

After the removal of the fibrous precipitates, an equivalent of 95% ethanol was added to the fermentation liquor and the resultant precipitates were collected and combined to give crude ribonucleic acid. The crude ribonucleic acid was subjected to deoxyribonuclease treatment and phenol treatment to give 2.0 g of purified ribonucleic acid. In order to obtain soluble ribonucleic acid, NaCl (1 mol) was added to the purified ribonucleic acid and it was stirred. The supernatant was collected and twice its volume of 95% ethanol was added. The resultant precipitates were dissolved in NaCl (0.1 mol) and further precipitated with isopropanol to give 0.1 g of soluble ribonucleic acid.

EXAMPLE 2

*Micrococcus ureae* (ATCC 21288) was cultured in a medium containing meat extract (1.0%), pepton (1.0%), NaCl (0.5%) and sorbitol (2%) and having an adjusted pH of 7.2 (before sterilization). Culturing was effected for 24 hours with shaking to obtain a seed culture. The seed culture was inoculated to a medium (3.0 l) containing meat extract (1.0%), peptone (1.0%), NaCl (0.5%) and sorbitol (10%) and having an adjusted pH of 7.2 (before sterilization). A 5 liter jar fermenter with a volume ratio of 10% was employed. The cultivation was carried out at 30°C for 48 hours with an agitation (400 r.p.m.) and aeration (1 l/min. The medium was adjusted to a pH 6.5 – 7.5 with ammonia water.

The fermentation liquor was treated in a similar manner to that described in Example 1 to recover high-molecular nucleic acids. 0.5 g of purified deoxyribonucleic acid and 0.5 g of crude ribonucleic acid were obtained from 1 liter of the fermentation liquor.

EXAMPLE 3

*Pseudomonas fluorescens* (ATCC 948) was cultured in a similar medium to that described in Example 2 for 24 hours with shaking. It was then inoculated to a medium (3.0 l) containing $KH_2PO_4$ (0.2%), $Na_2HPO_4$ (0.2%), $MgSO_4 \cdot 7H_2O$ (0.1%), $MnSO_4 \cdot 4H_2O$ (0.002%), $FeSO_4 \cdot 7H_2O$ (0.02%), $ZnSO_4 \cdot 7H_2O$ (0.001%), $(NH_4)_2SO_4$ (0.5%, $CuCl_2 \cdot 4H_2O$ (0.0003%), corn steep liquor (0.1%), yeast extract (0.1%) and n-paraffine (a mixture of $C_{12}$, $C_{13}$, $C_{14}$ and $C_{15}$), (10% - v/v) in a 5 liter jar fermenter at a volume ratio of 10%.

The cultivation was carried out in a similar manner to those described in Examples 1 and 2 for 72 hours at 30°C with an agitation (600 r.p.m.) and aeration (3 l/min. The medium was adjusted to pH 7.0 – 7.5 with ammonia water.

When the cultivation was completed, the n-paraffin was completely consumed. Microbial cells were removed from the fermentation liquor and the supernatant was treated in a similar manner to that described in Example 1 to give 1.0 g of purified deoxyribonucleic acid and 1.8 g of crude ribonucleic acid from 1 liter of the supernatant.

EXAMPLE 4

*Aspergillus oryzae* (ATCC 7252) was cultured for 96 hours at 25°C in a similar manner to that described in Example 3 using similar seed and fermentation media to those described in Example 3. The fermentation liquor was treated in a similar manner to that described in Example 1 to give 0.4 g of purified deoxyribonucleic and 0.7 g of crude ribonucleic acid.

EXAMPLE 5

*Candida lipolihca* (ATCC 8861) was cultured in a similar manner to that described in Example 3 using a similar seed medium to that described in Example 3. The fermentation medium which was prepared by adding Span-80 (Trademark for nonionic surface active agent available from Atlas Chemical Co., Ltd.) to a similar medium to that described in Example 3.

The cultivation was carried out at 30°C for 96 hours. The resultant fermentation liquor was treated in a similar manner to that described in Example 1 to give 0.2 g of purified deoxyribonucleic acid and 0.7 g of crude ribonucleic acid from 1 liter of the fermentation liquor.

What is claimed is:

1. A process for producing a high-molecular nucleic acid selected from the group consisting of deoxyribonucleic acid and ribonucleic acid by fermentation, which consists essentially of culturing aerobically a microorganism capable of accumulating said nucleic acid directly in a fermented liquor and belonging to *Arthrobacter, Brevibacterium, Corynebacterium, Pseudomonas, Aspergillus* and Candida in a medium containing at least one member of the class consisting of hydrocarbons and carbohydrates as the main carbon source and nitrogen source, accumulating said nucleic acid directly in the fermented liquor and isolating the accumulated nucleic acid from the fermented liquor.

2. A process of claim 1, in which the microorganism is a member selected from the group consisting of *Arthrobacter paraffineus, Arthrobacter simplex, Arthrobacter hydrocarboglutamicus, Brevibacterium ketoglutamicum, Corynebacterium hydrocarboclastus, Micrococcus ureae, Pseudomonas fluorescens, Pseudomonas aeruginosa, Aspergillus oryzae* and *Candida lipolitica*.

3. A process of claim 2, in which the microorganism is a member selected from the group consisting of *Arthrobacter paraffineus* ATCC 15590, *Arthrobacter simplex* ATCC 15799, *Arthrobacter hydrocarboglutamicus* ATCC 15583, *Brevibacterium ketoglutamicum* ATCC 15587, *Micrococcus aureae* ATCC 21288, *Corynebacterium hydrocarboclastus* ATCC 15592, *Pseudomoas fluorescens* ATCC 948, *Pseudomonas aeruginosa* ATCC 15246, *Aspergillus oryzae* ATCC 7252 and *Candida lipolitica* ATCC 8861.

4. A process of claim 1, in which the carbon source is at least one member selected from the group consisting of glucose, sorbitol and n-paraffins having carbon atoms of 10 to 22.

5. A process of claim 1, in which the culturing is effected at a temperature of from 20° to 60°C and at a pH of from 6 to 9.

6. A process of claim 1, in which the microbial cell bodies are removed from the fermented liquor after completion of the fermentation.

7. A process for producing a high-molecular nucleic acid selected from the group consisting of deoxyribonucleic acid and ribonucleic acid by fermentation, which consisting essentially of culturing aerobically a microorganism capable of accumulating said nucleic acid directly in a fermented liquor and selected from the group consisting of *Arthrobacter paraffineus, Arthrobacter simplex, Arthrobacter hydrocarboglutamicus,* Brevibacterium ketoglutamicum, Corynebacterium hydrocarboclastus, Micrococcus ureae, Pseudomonas fluorescens, Pseudomonas aeruginosa, Aspergillus oryzae and *Candida lipolitica* at a temperature of 20° to 60°C and at a pH of from 6 to 9 in a medium containing at least one member of the class consisting of hydrocarbons and carbohydrates as the main carbon source and nitrogen source, accumulating said nucleic acid directly in the fermented liquor and selectively isolating the accumulated nucleic acid from the fermented liquor.

8. The process of claim 7 wherein said microorganism is selected from the group consisting of *Arthrobacter paraffineus* ATCC 15590, *Arthrobacter simplex* ATCC 15799, *Arthrobacter hydrocarboglutamicus* ATCC 15583, *Brevibacterium ketoglutamicum* ATCC 15587, *Micrococcus ureae* ATCC 21288, *Corynebacterium hydrocarboclastus* ATCC 15592, *Pseudomonas fluorescens* ATCC 948, *Pseudomonas aeruginosa* ATCC 15246, *Aspergillus oryzae* ATCC 7252 and *Candida lipolitica* ATCC 8861.

9. The process of claim 7, wherein after accumulating said nucleic acid in the fermented liquor, the microbial cell bodies are removed from the fermented liquor.

* * * * *